(12) United States Patent  
Lu

(10) Patent No.: US 7,263,915 B2  
(45) Date of Patent: Sep. 4, 2007

(54) STRUCTURE OF A TWIN DISC TYPE TOOL TURRET DEVICE OF A MACHINE

(75) Inventor: Yung-Hsiang Lu, Chiayi (TW)

(73) Assignee: Far East Machinery Co., Ltd., Chiayi (TW)

( * ) Notice: Subject to any disclaimer, the term of this patent is extended or adjusted under 35 U.S.C. 154(b) by 173 days.

(21) Appl. No.: 11/128,204

(22) Filed: May 13, 2005

(65) Prior Publication Data

US 2006/0254384 A1 Nov. 16, 2006

(51) Int. Cl.
*B32Q 16/02* (2006.01)
*B23B 3/16* (2006.01)

(52) U.S. Cl. ............................ 74/813 R; 29/36; 29/39; 29/48.5 A; 82/121; 82/159; 74/813 L; 74/816; 74/819

(58) Field of Classification Search .............. 74/813 R, 74/816, 819, 822, 826, 813 L; 82/121, 159; 29/36, 39, 48.5 A See application file for complete search history.

(56) References Cited

U.S. PATENT DOCUMENTS

| | | | | |
|---|---|---|---|---|
| 4,706,351 A * | 11/1987 | Chuang | ......................... | 29/39 |
| 4,991,474 A * | 2/1991 | Thumm et al. | ............... | 82/159 |
| 5,657,523 A * | 8/1997 | Lin et al. | ................. | 29/48.5 A |
| 7,010,839 B2 * | 3/2006 | Lu | ............... | 29/36 |
| 7,066,063 B2 * | 6/2006 | Lu | .............. | 82/121 |

* cited by examiner

*Primary Examiner*—Vinh T. Luong  
(74) *Attorney, Agent, or Firm*—Rosenberg, Klein & Lee

(57) ABSTRACT

A turret includes a central shaft, a piston sleeve positioned around the central shaft and having moving sticks thereon, a push rod, an actuating seat, and internal and external turrets; the piston sleeve is left and right movable by a power source; the moving sticks are passed through a ringed sleeve, which props a push rod passed through a fixed clutch claw, and facing the actuating seat; the actuating seat includes a rotary shaft, a pivotal shaft, and a toothed ring seat; the piston sleeve can be moved such that the moving sticks and the push rod move forwards, and the rotary shaft engages the toothed ring seat for a tool of a straight tool seat to function; alternatively the piston sleeve can be moved such that the moving sticks and the push rod move backwards, and the rotary shaft disengages the toothed ring seat for allowing replacement of the toothed ring seat.

3 Claims, 9 Drawing Sheets

STRUCTURE OF A TWIN DISC TYPE TOOL TURRET DEVICE OF A MACHINE

BACKGROUND OF THE INVENTION

1. Field of the Invention

The present invention relates to a twin disk type tool turret device of a machine, more particularly one, which includes a central shaft, a piston positioned around and movable on the central shaft, a push rod and several moving sticks connected to the piston sleeve, and an internal turret equipped with an actuating seat such that the piston sleeve can be moved to a locking position for the tool set to function, and the piston sleeve can be moved to a loosening position for allowing another tool to be chosen from the tool set.

2. Brief Description of the Prior Art

Conventionally, a twin disk type tool turret device of a machine includes a power switching mechanism, an external toothed ring, a central shaft, an internal turret, and an external turret. The power switching mechanism can be switched such that power of a power source is transmitted to the external toothed ring, and the internal turret is turned for allowing one of the tools thereon to be chosen. And, the power switching mechanism can be switched such that power of a power source is transmitted to the central shaft, and the external turret is turned for allowing one of the tools thereon to be chosen.

More specifically, an external toothed ring is securely joined to the internal turret while the central shaft is securely joined to the external turret. The central shaft further has a gear secured thereon. The power switching mechanism includes a rotary sleeve, a transmission shaft, and a transmission sleeve, and the power source is a servomotor, which has an output shaft having a bevel gear secured thereon. The transmission shaft has a pinion secured thereon and engaged with the external toothed ring while the transmission sleeve has a gear secured thereon and engaged with the gear of the central shaft. The bevel gear of the servomotor is engaged with a bevel gear of the rotary sleeve. The rotary sleeve is positioned around both the transmission shaft and the transmission sleeve, and it is disengageably engaged with either the transmission shaft or the transmission sleeve such that power will be passed on to one of the transmission shaft and the transmission sleeve. Therefore, the transmission shaft can be actuated such that the internal turret is turned for allowing one of the tools thereon to be chosen. And, the transmission sleeve can be actuated such that the external turret is turned for allowing one of the tools thereon to be chosen. Furthermore, the transmission shaft has a piston secured thereon, which piston is connected to conduits connected to a power source such that the transmission shaft and the transmission sleeve can be displaced to desired position.

However, the above turret device is particularly used for cutting action, but it can't be used for drilling or knurling action.

SUMMARY OF THE INVENTION

It is a main object of the invention to provide a twin disk type tool turret device to overcome the above problems. The turret device includes a central shaft, a piston sleeve positioned around the central shaft and having moving sticks thereon, a push rod, an actuating seat, and internal and external turrets. The piston sleeve is left and right movable by a power source. The moving sticks are passed through a ringed sleeve, which props a push rod passed through a fixed clutch claw, and facing the actuating seat. The actuating seat includes a rotary shaft, a pivotal shaft, and a toothed ring seat. The piston sleeve can be moved in such a direction that the moving sticks and the push rod move forwards, and the rotary shaft engages the toothed ring seat for a tool of a straight tool seat to function. And, the piston sleeve can be moved such that the moving sticks and the push rod move backwards, and the rotary shaft disengages the toothed ring seat for allowing replacement of the toothed ring seat.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
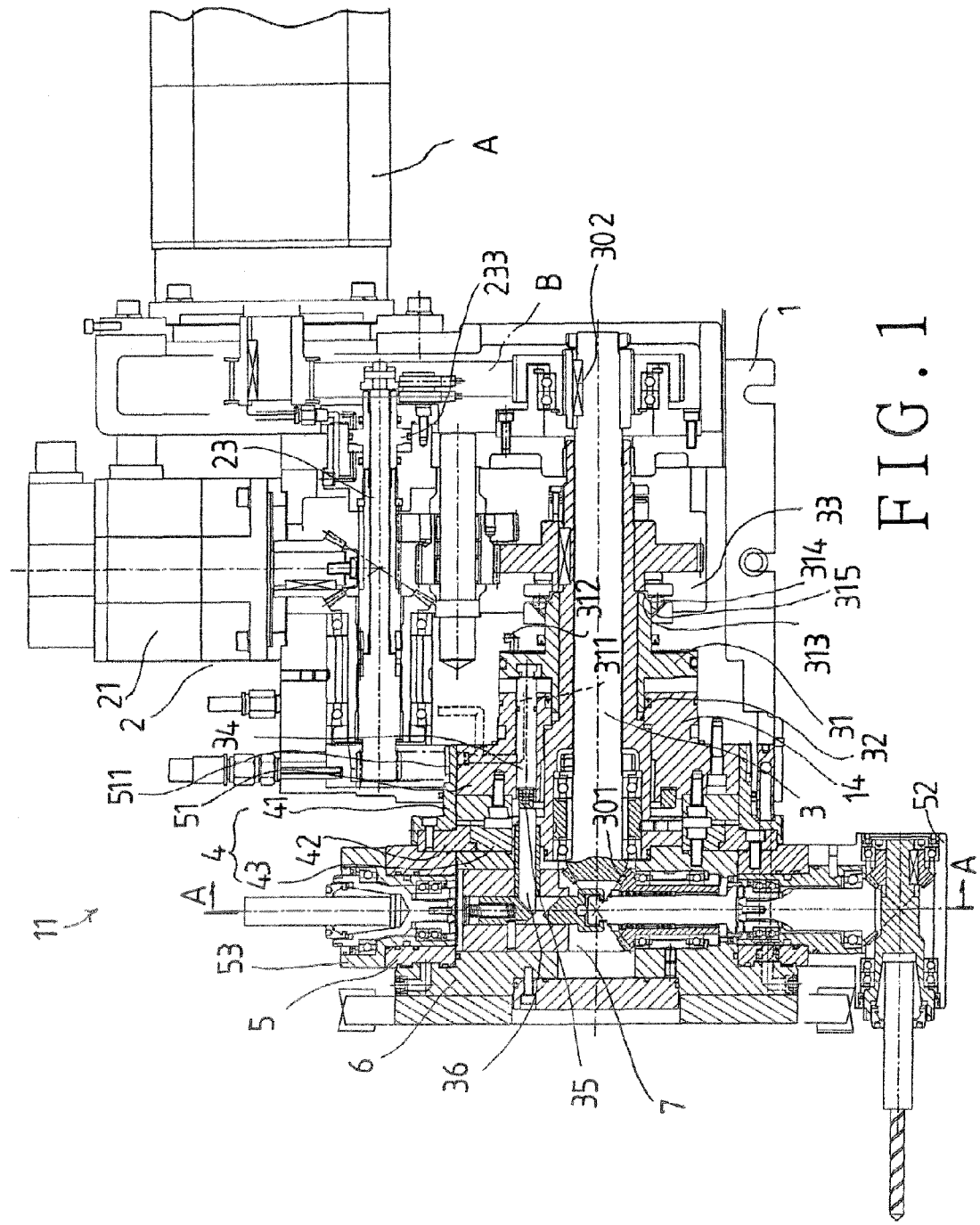
FIG. 1 is an elevation cross-sectional view of the turret device of the invention.
Figure 2:
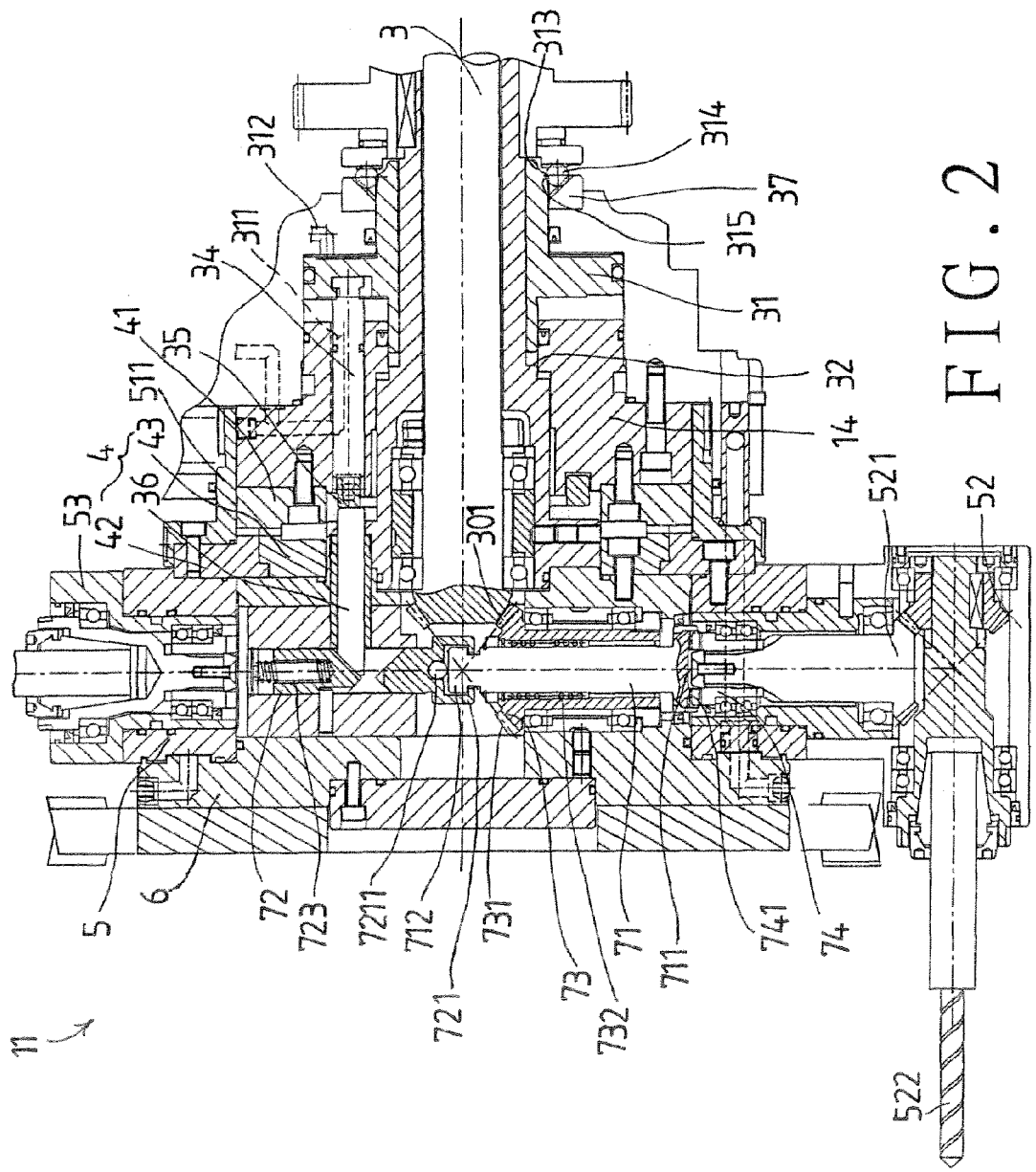
FIG. 2 is a partial elevation cross-sectional view of the actuating seat for the turret device of the invention.
Figure 3:
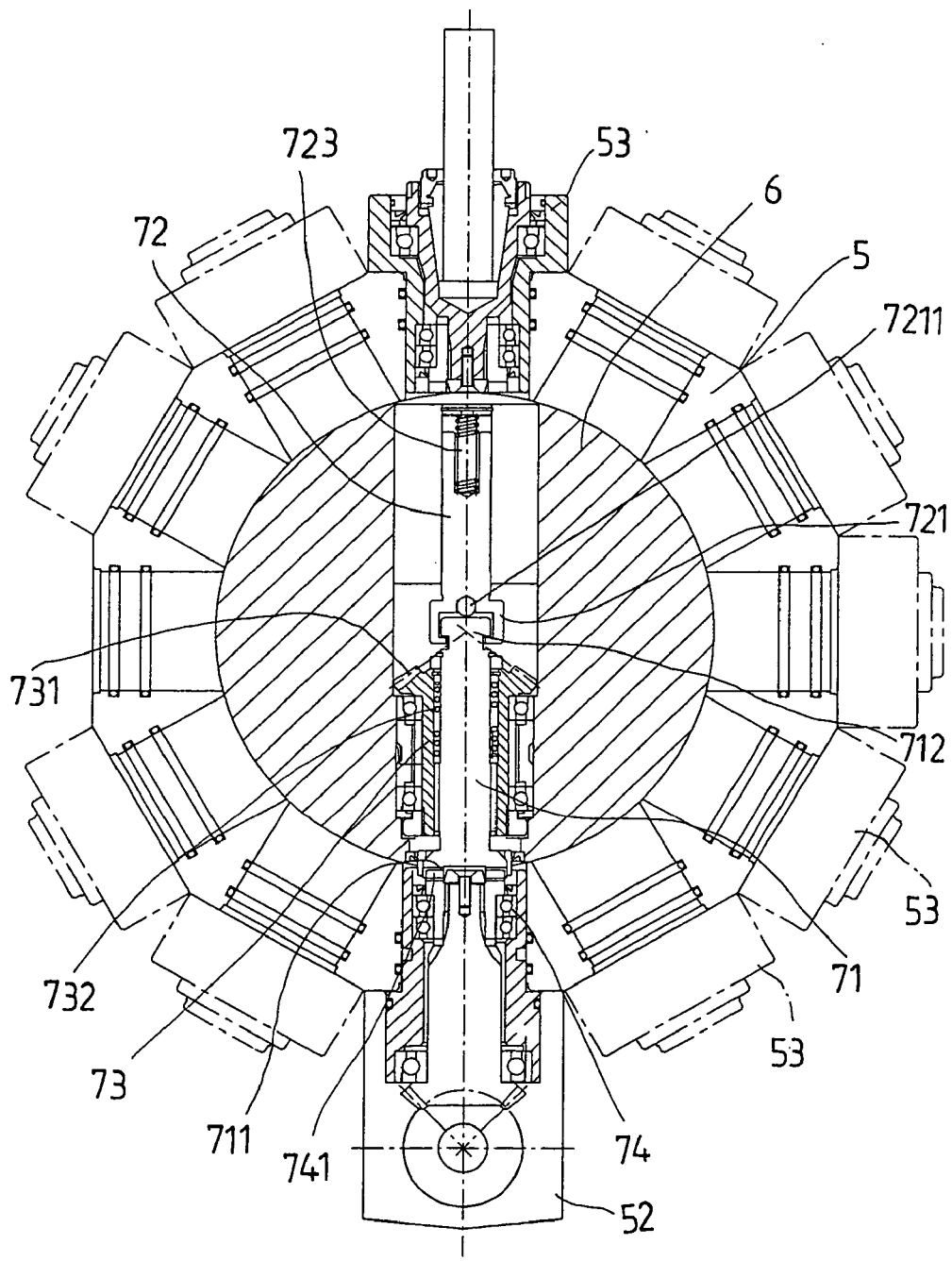
FIG. 3 is a sectional view taken along section line A-A in FIG. 1 showing a first position of a tool-choosing action.
Figure 4:
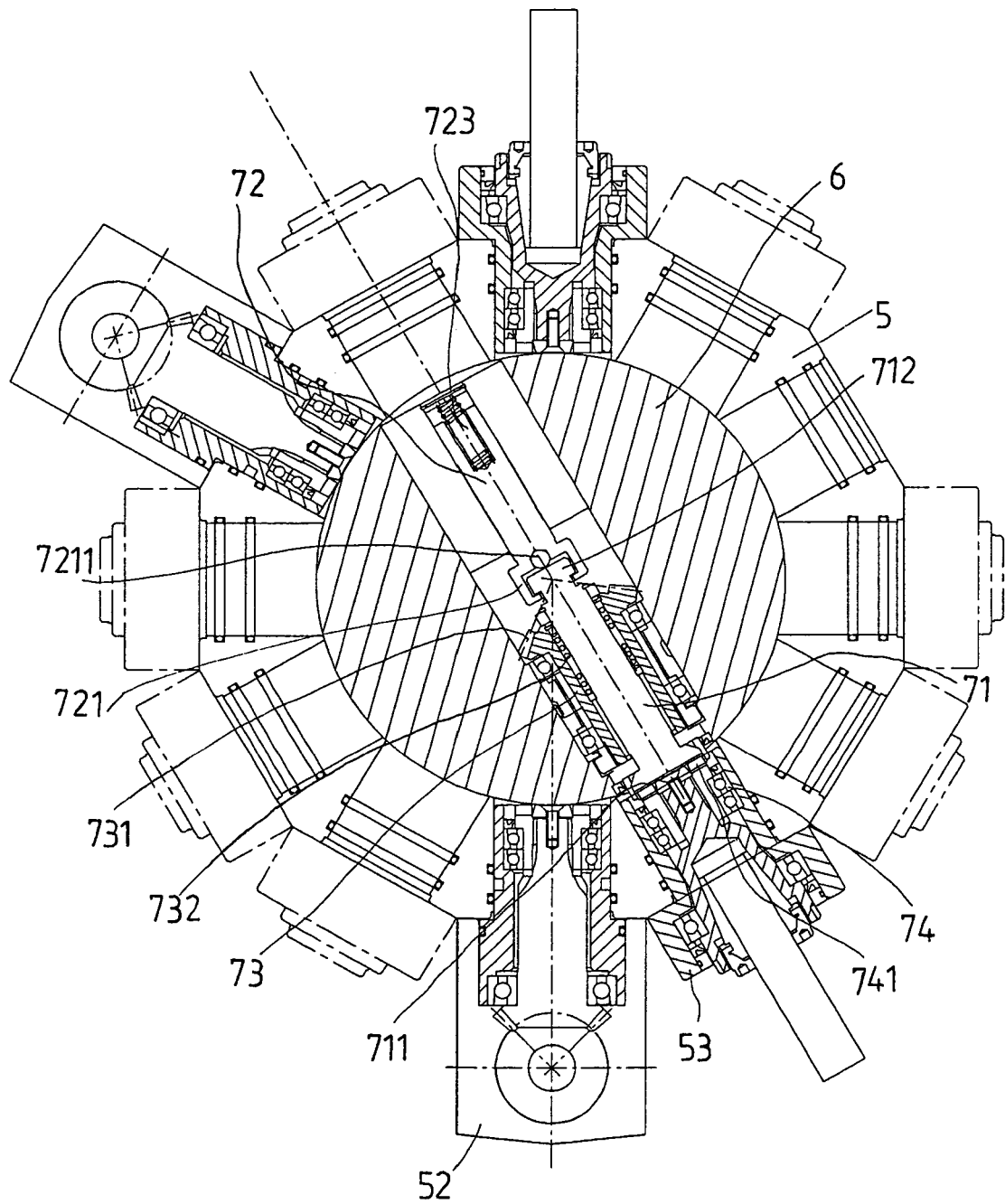
FIG. 4 is a side sectional view taken along section line A-A in FIG. 1 showing a second position of a tool-choosing action.

Referring to FIGS. 1 to 4, a preferred embodiment of a twin disk type tool turret device 11 of a machine includes a base member 1, a power switching mechanism 2, a central shaft 3, a clutch 4, an internal turret 5, and an external turret 6.

The base member 1 has a fixed ring 14 fixed thereon, and an external toothed ring 51 is positioned around the fixed ring 14.

Figure 8:
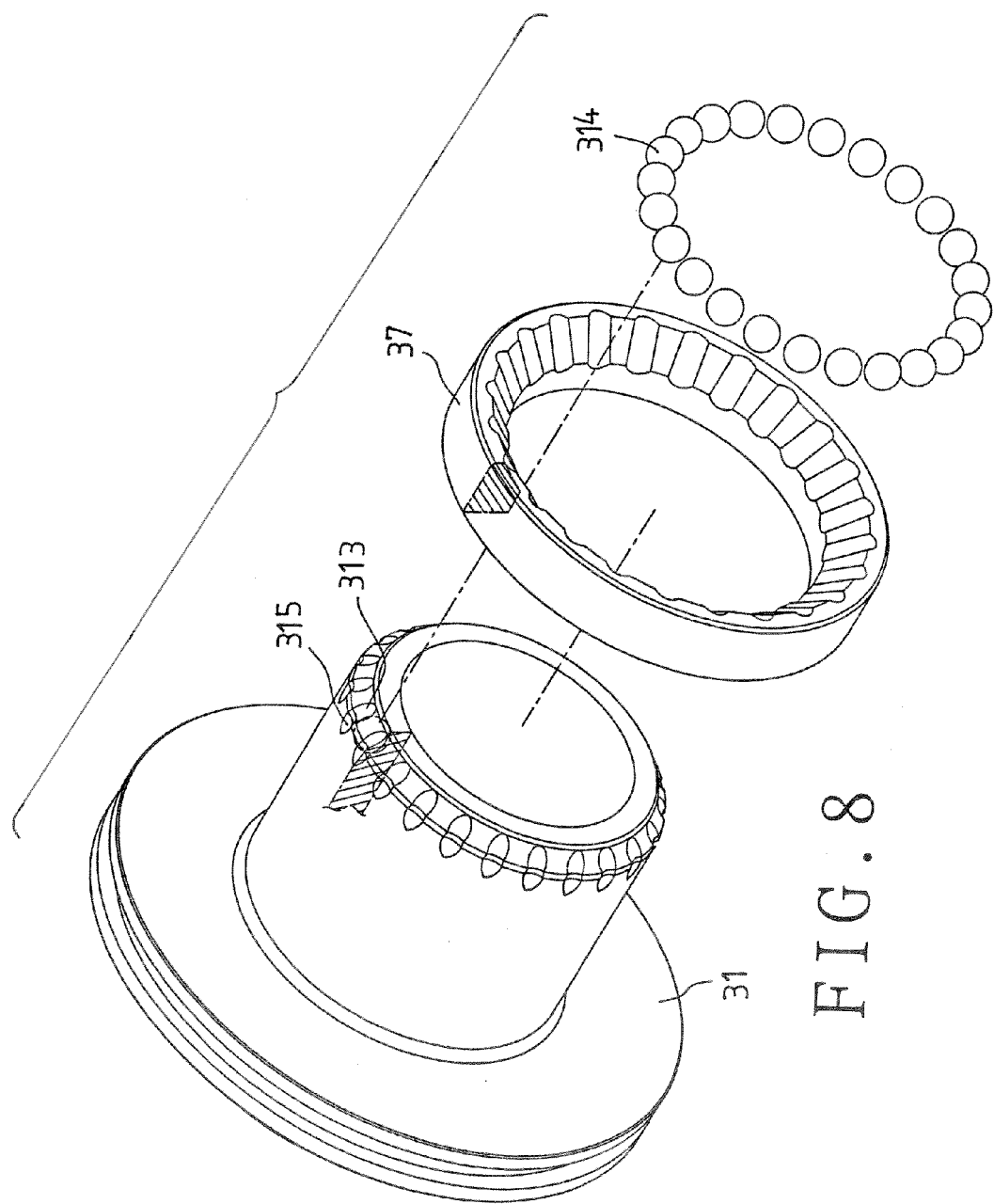
FIG. 8 is a perspective exploded view of the piston sleeve in the invention.
Figure 10:
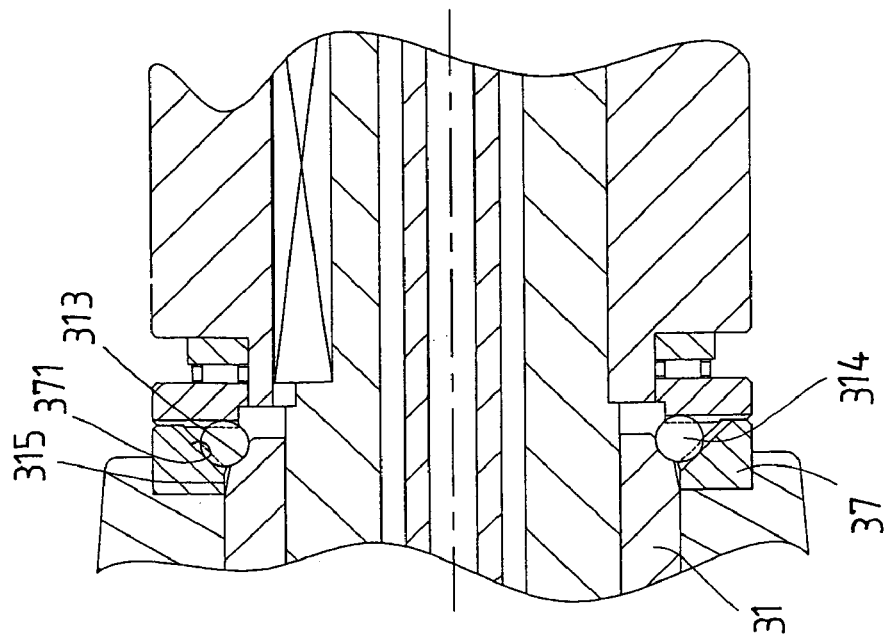
FIG. 10 is an enlarged sectional view of the piston sleeve in showing the piston sleeve in a leftmost position.
Figure 9:
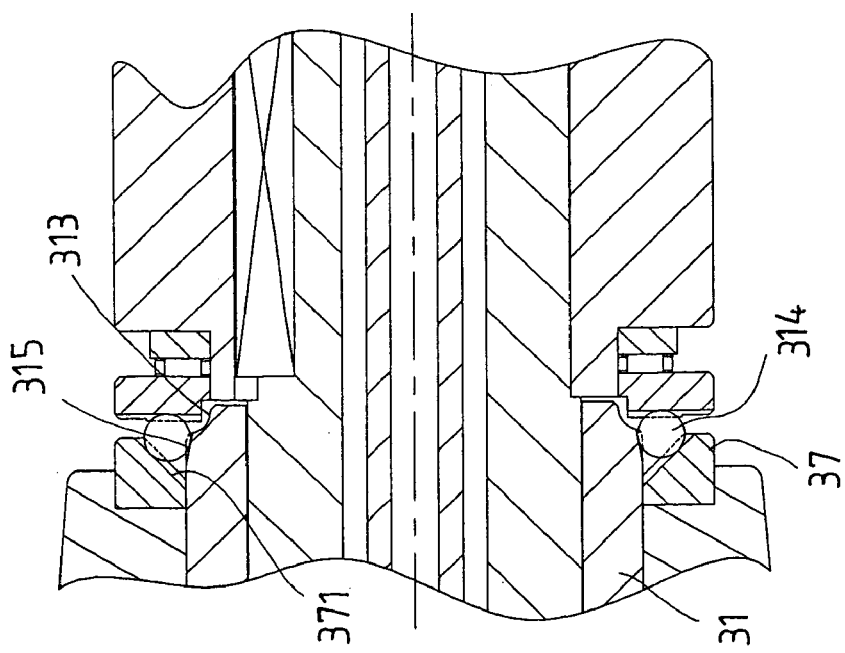
FIG. 9 is an enlarged sectional view of a portion of the piston sleeve showing the piston sleeve in a rightmost position.

The central shaft 3 is arranged on the base member 1, and has a toothed seat 301 at a first end, a transmission portion 302 at a second end, a piston sleeve 31 positioned around a middle portion thereof, and a step-shaped portion 32 and a push ring 33 thereon. The transmission portion 302 is connected to a synchronous belt (B), which is connected to a power source (A). Conduits 311, and 312 are connected to the piston sleeve 32 and a second power source 21, which can be a hydraulic one or a pneumatic one; thus, when the power source is actuated, the piston sleeve 32 will move left and right, and exert force on the step-shaped portion 32 and the push ring 33 to cause left and right linear displacement of the central shaft 3. The piston sleeve 31 further has several equidistantly spaced concave cavities 313, on which steel beads 314 are positioned, as shown in FIGS. 8 to 10.

The clutch 4 has a fixed clutch claw 41, which fixed to a left end of the fixed ring 14 secured on the base member 1.

Furthermore, several spaced-apart moving sticks 34 are fitted on an outer side of the piston sleeve 31, and passed into the fixed ring 14 at first ends thereof. A gear 511 and a pinion engage each other next a right end of the external toothed ring 51, which is positioned around the fixed ring 14; the gear 511 and the pinion are the same as those of the prior art therefore they aren't shown herein. An external ring clutch claw 42 is securely connected to a left end of the external toothed ring 51. The internal turret 5 includes a right-angle power tool seat 52, and a straight power tool seat 53 (or special power tool seat), and it is securely joined to the external ring clutch claw 42; thus, the external toothed ring 51 will cause the internal turret 5 to turn when actuated. An actuating seat 7 is held in the external turret 6. The moving sticks 34 on the piston sleeve 31 are passed through and securely joined to a ringed sleeve 35, and the ringed sleeve 35 props a push rod 36, which is passed through the fixed clutch claw 41 on the base member 1, and faces the actuating seat 7.

The actuating seat 7 includes a rotary shaft 71, a pivotal shaft 72, an external gear seat 73, and a clutch toothed ring seat 74. The rotary shaft 71 has a toothed portion 711 on a first end, and a connecting head 712 at a second end, and it can be engaged with and disengaged from a toothed portion 741 of the clutch toothed ring seat 74 at the toothed portion 711 thereof.

The pivotal shaft 72 has a connecting portion 721 at a first end, which is joined to the connecting head 712 of the rotary shaft 71, and which holds a rolling bead 7211 therein. The pivotal shaft 72 has a hole 722 facing the push rod 36 such that when the push rod 36 is moved forwards, and passed into the hole 722, it will make the pivotal shaft 72 move upwards, and in turn the toothed portion 711 of the rotary shaft 71 move upwards together with the pivotal shaft 72. The rotary shaft 72 has an elastic element 723 at a second end thereof.

The external gear seat 73 has a toothed seat 731, which is engaged with the toothed seat 301 of the central shaft 3. The external gear seat 73 is positioned around the rotary shaft 71 such that the rotary shaft 71 is linearly slidable and angularly displaceable within the external gear seat 73. An elastic element 732 is positioned between the external gear seat 73 and the rotary shaft 71.

The clutch toothed ring seat 74 has a toothed portion 741 at a first end thereof, which is next to the toothed portion 711 of the rotary shaft 71. Either the right-angle power tool seat 52 or the straight power tool seat 53 (or special power tool seat) is joined to a second end of the clutch toothed ring seat 74.

Figure 5:
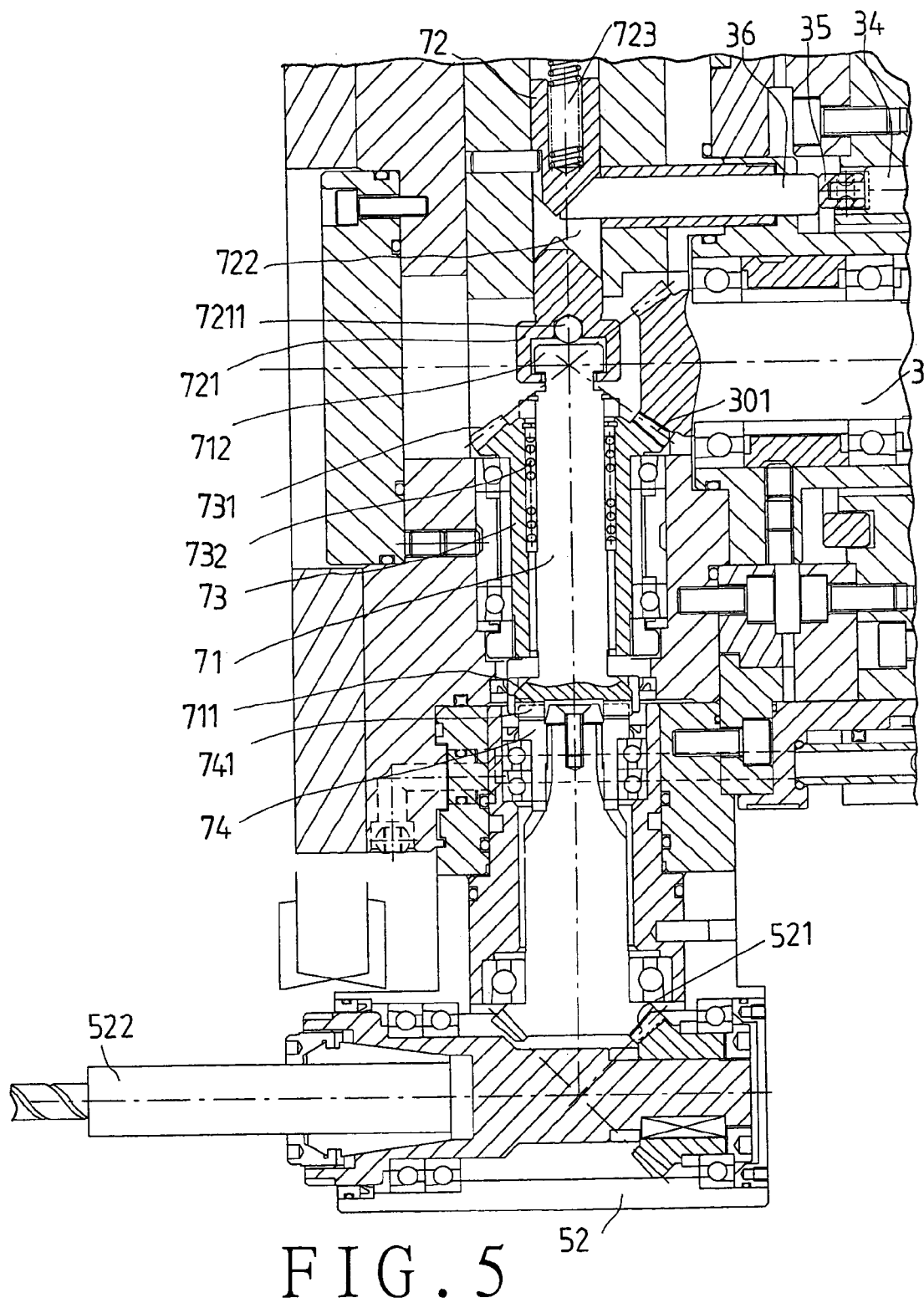
FIG. 5 is a partial elevation cross-sectional view of the actuating seat of the present turret device in a first position.
Figure 6:
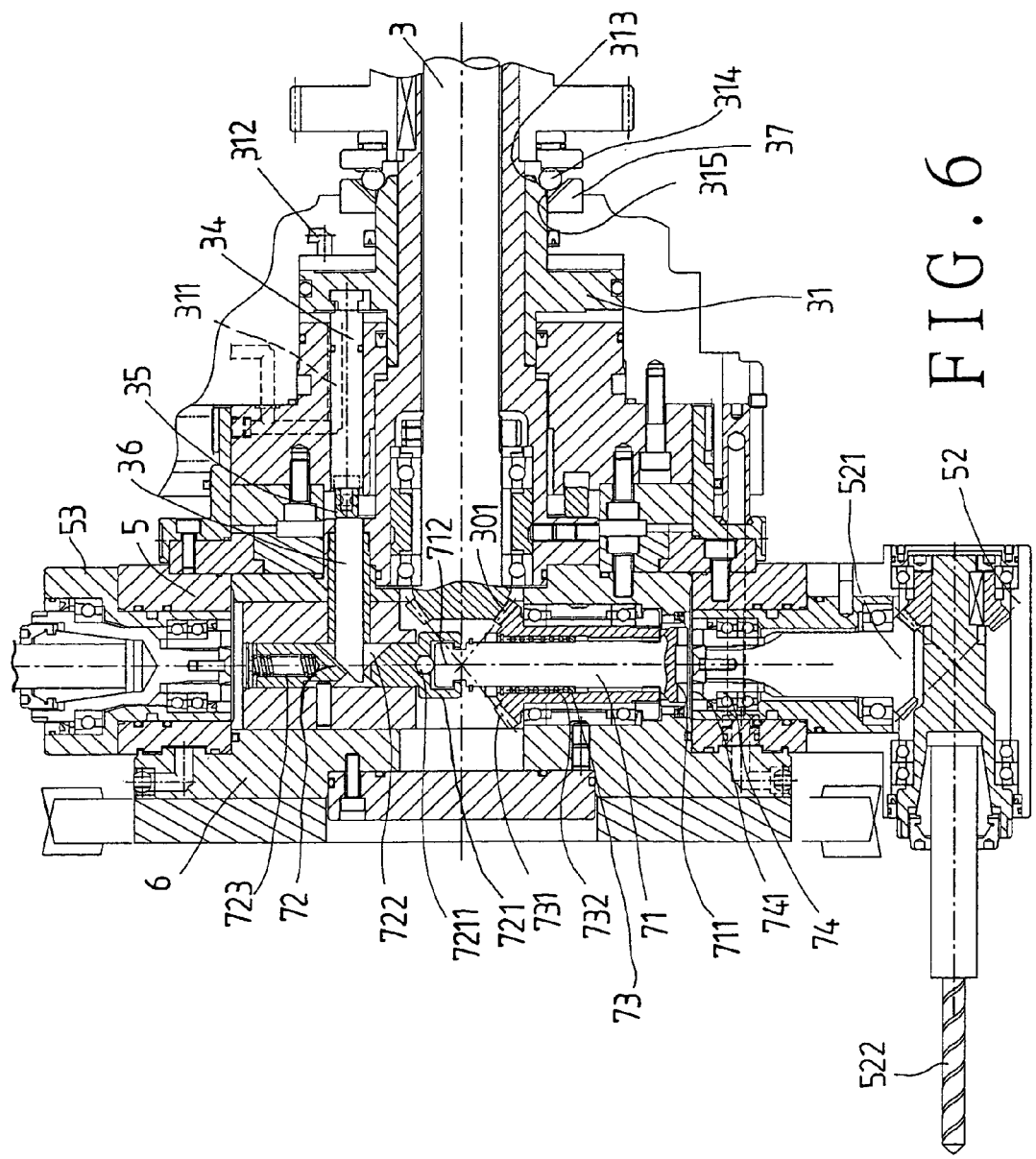
FIG. 6 is a partial elevation cross-sectional view of the actuating seat of the present turret device in a second position.
Figure 7:
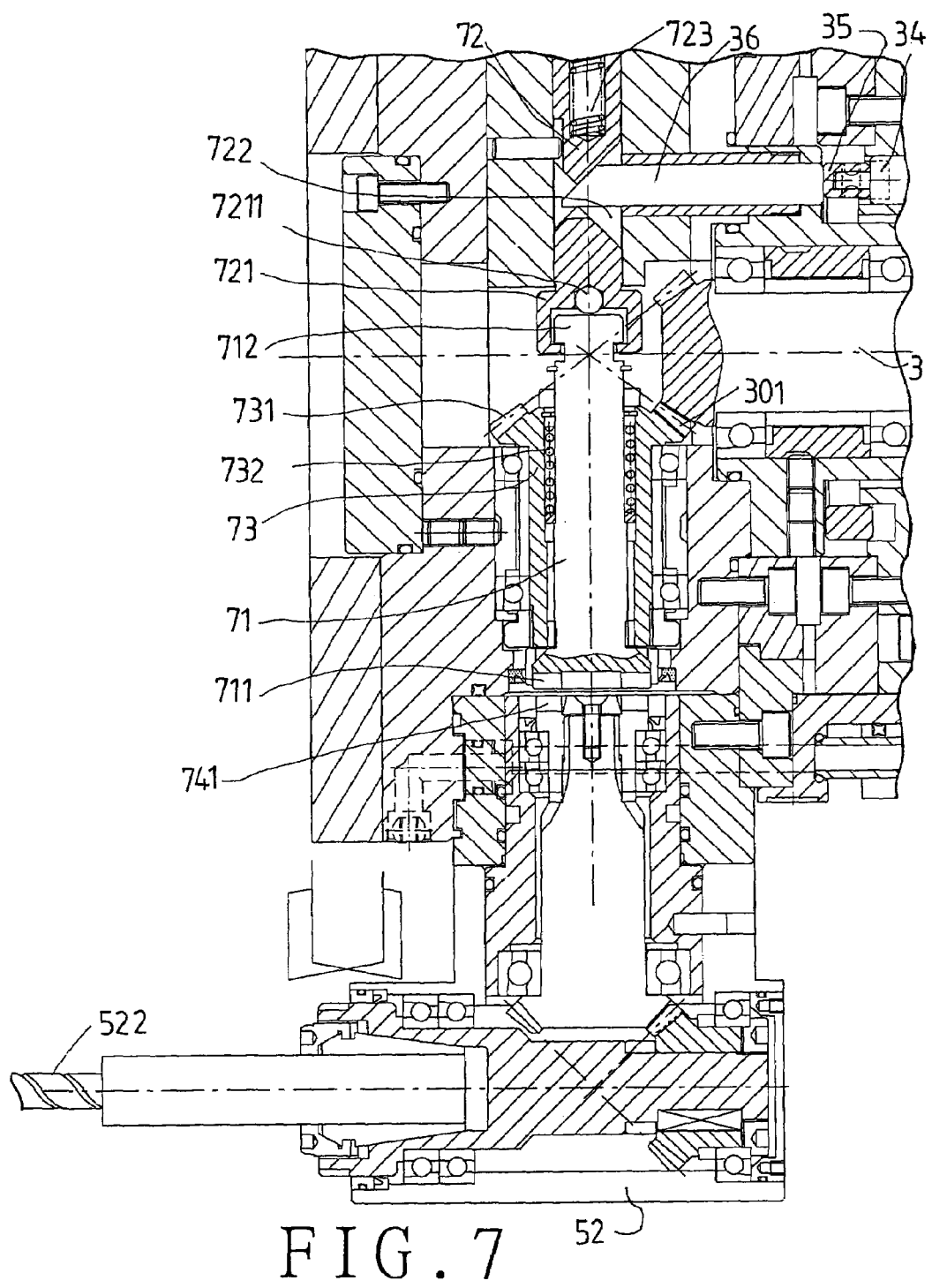
FIG. 7 is a partial elevation cross-sectional view of the actuating seat of the present turret device in a third position.

Referring to FIGS. 5, 6, and 7, which show the twin disk type tool turret mechanism of the invention being in action, first the second power source 21, which is connected to the conduits 311, 312, is used to make the piston sleeve 31 move leftwards such that the piston sleeve 31 comes into contact with the step-shaped portion 32 of the central shaft 3, and forces the central shaft 3 to move leftwards; thus, the internal turret 5 and the external turret 6 moves leftwards at the same time, and the external ring clutch claw 42 and the internal clutch claw 43 are separated from the fixed clutch claw 41. Then, the second power source 21 is used to provide power to cause rotation of the internal turret 5 for allowing tool choosing action, which power is transmitted through a bevel gear 221, engaging teeth 222, a pinion 232, the gear 511, and the external ring clutch claw 42; the tool choosing action is the same as that of the prior art, therefore it isn't detailed herein.

When the internal turret 5 is turning for allowing tool choosing action, and the operator chooses a tool from those on the external turret 6, there has to be an empty tool seat provided on the internal turret 5 for allowing the tool chosen from the external turret 6 to be used because the internal turret 5 has the right-angle power tool seat 52 and the straight power tool seat 53 secured thereon; if the operator chooses a tool from those on the internal turret 5, there won't have to be an empty tool seat provided on the internal turret 5. The right-angle power tool seat 52 and the straight power tool seat 53 can be equipped various kinds of tools, e.g. drills, boring tools, and milling cutters. After a tool 522 is chosen, the operators actuates the second power source 21, which is connected to the conduits 311, 312, to make the piston sleeve 31 move leftwards such that the piston sleeve 31 comes into contact with the step-shaped portion 32 of the central shaft 3, and forces the central shaft 3 to move leftwards; thus, the moving sticks 34 fitted on the piston sleeve 31 move leftwards, and cause the ringed sleeve 35 connected to the front ends of the moving sticks 34 props the push rod 36, which is passed through the fixed clutch claw 41. Consequently, the push rod 36 is tightly passed into the hole 722 of the pivotal shaft 72 of the actuating seat 7, and makes the pivotal shaft 72 move upwards, and the pivotal shaft 72 makes the rotary shaft 71 move up together with, and the toothed portion 711 of the rotary shaft 71 separate from the toothed portion 741 of the clutch toothed ring seat 74, for allowing replacement of the clutch toothed ring seat 74.

The operators actuates the second power source, which is connected to the conduits 311, 312, to make the piston sleeve 31 move rightwards after another clutch toothed ring seat is placed in position instead of the original one 74; when moving rightwards, the piston sleeve 31 will come into contact with a locating ring 37, which has several equidistantly spaced sloping trenches 371, such that the steel beads 314 positioned on the concave cavities 313 of the piston sleeve 31 will be subjected to pressure, and will be gradually relocated to slightly sloping trenches 315 formed next to the concave cavities 313, as shown in FIGS. 8, 9, and 10. The sloping trenches 371 of the locating ring 37 are much more sloping than the slightly sloping trenches 315. Because the angle between the axis of the piston sleeve 31 and the slightly sloping trenches 315 is relatively small the steel beads 314 will be subjected to great pushing force after they are relocated to the slightly sloping trenches 315. And, the steel beads 314 will move along the sloping trenches 371 of the locating ring 37, and the piston sleeve 31 is secured in position. After the piston sleeve 31 is secured in position, the moving sticks 34 are moved in the reverse direction from the piston sleeve 31, and pull the push rod 36 back, which is tightly passed into the hole 722 of the pivotal shaft 72. And, the elastic element 723 on the pivotal shaft 72 is stretched, and the elastic element 732 between the external gear seat 73 and the rotary shaft 71 is stretched as well. Thus, the pivotal shaft 72 makes the rotary shaft 71 move back to the original position 71, and the toothed portion 711 of the rotary shaft 71 engages the toothed portion 741 of the clutch toothed ring seat 74. Then, the power source (A) is actuated; thus, movement is passed on to the transmission portion 302 of the central shaft 3 through the synchronous belt (B), and the toothed seat 301 of the central shaft 3 causes the external gear seat 73 to turn together, and in turn the rotary shaft 71 is turned together with the external gear seat 73. And, the toothed portion 741 of the clutch toothed ring seat 74 will turn together with the rotary shaft 71 because the toothed portion 741 is engaged with the toothed portion 711 of the rotary shaft 71. Because the right-angle power tool seat 52 has a bevel gear 521 therein, and the clutch toothed ring seat 74 is faced with the right-angle power tool seat 52, movement will be passed on to the bevel gear 521, and in turn the drill of the preferred embodiment starts working; other kinds of tools can be used together with the straight power tool seat 53 instead of the drill and the right-angle power tool seat 52 of the present embodiment.

Because the connecting portion 721 at the first end of the pivotal shaft 72 is joined to the connecting head 712 of the rotary seat 71, and holds the rolling bead 7211 therein, the rotary shaft 71 and the connecting portion 721 will touch if the connecting portion 721 isn't tightly engaged with the connecting head 712; normally, the rotary shaft 71 and the connecting portion 721 don't touch. Because of the rolling bead 7211 held in the connecting portion 721 of the pivotal shaft 72, the connecting portion 721 will touch the connecting head 712 of the rotary shaft 71 at single point, and there won't be high temperature produced owing to rubbing of the rotary shaft 71 against the connecting portion 721 of the pivotal shaft 72.

What is claimed is:

1. A structure of a twin disc type tool turret device of a machine, comprising:
   a base member;
   a central shaft arranged on the base member; the central shaft having a toothed seat at a first end, and a transmission portion at a second end; the central shaft having a piston sleeve positioned around a middle portion thereof; the transmission portion being connected to a synchronous belt connected to a first power source; the piston sleeve being connected to a second power source such that when the second power source is actuated, the piston sleeve is moved left and right; the piston sleeve having a plurality of spaced-apart moving sticks fitted on an outer side thereof; the moving sticks being passed into a fixed ring, which is secured on the base member, at first ends thereof;
   an actuating seat in an external turret;
   the moving sticks being passed through and securely joined to a ringed sleeve; the ringed sleeve propping a push rod, which is passed through a fixed clutch claw on the base member, and faces the actuating seat;
   the actuating seat including:
      a rotary shaft having a toothed portion on a first end, and a connecting head at a second end;
      a pivotal shaft; the pivotal shaft having a connecting portion at a first end, which is joined to the connecting head of the rotary shaft, and which holds a rolling bead therein; the pivotal shaft having a first hole facing the push rod such that when the push rod is moved forwards, and passed into the first hole, the push rod will make the pivotal shaft move upwards, thus making the toothed portion of the rotary shaft move upwards together with the pivotal shaft; the rotary shaft having an elastic element at a second end thereof;
      an external gear seat; the external gear seat having a toothed seat, which is engaged with the toothed seat of the central shaft; the external gear seat being positioned around the rotary shaft such that the rotary shaft is linearly slidable and angularly displaceable within the external gear seat; a second elastic element being positioned between the external gear seat and the rotary shaft; and
      a clutch toothed ring seat; the clutch toothed ring seat having a toothed portion at a first end thereof, which is next to the toothed portion of the rotary shaft; the clutch toothed ring seat being joined to a right-angle power tool seat at a second end thereof;
      the rotary shaft be capable of being engaged with and disengaged from a toothed portion of the clutch toothed ring seat at the toothed portion thereof;
   whereby the piston sleeve of the central shaft can be actuated such that the moving sticks and the push rod are moved forwards, and the rotary shaft of the actuating seat is engaged with the clutch toothed ring seat for allowing a tool of the right-angle power tool seat to function, and
   whereby the piston sleeve of the central shaft can be actuated such that the moving sticks and the push rod are moved backwards, and the rotary shaft of the actuating seat is disengaged from the clutch toothed ring seat for allowing replacement of the clutch toothed ring seat.

2. A structure of a twin disc type tool turret device of a machine, comprising:
   a base member;
   a central shaft arranged on the base member; the central shaft having a toothed seat at a first end, and a transmission portion at a second end; the central shaft having a piston sleeve positioned around a middle portion thereof; the transmission portion being connected to a synchronous belt connected to a first power source; the piston sleeve being connected to a second power source such that when the second power source is actuated, the piston sleeve is moved left and right; the piston sleeve having a plurality of spaced-apart moving sticks fitted on an outer side thereof; the moving sticks being passed into a fixed ring, which is secured on the base member, at first ends thereof;
   an actuating seat in an external turret;
   the moving sticks being passed through and securely joined to a ringed sleeve; the ringed sleeve propping a push rod, which is passed through a fixed clutch claw on the base member, and faces the actuating seat;
   the actuating seat including:
      a rotary shaft having a toothed portion on a first end, and a connecting head at a second end;
      a pivotal shaft; the pivotal shaft having a connecting portion at a first end, which is joined to the connecting head of the rotary shaft, and which holds a rolling bead therein; the pivotal shaft having a first hole facing the push rod such that when the push rod is moved forwards, and passed into the first hole, the push rod will make the pivotal shaft move upwards, thus making the toothed portion of the rotary shaft move upwards together with the pivotal shaft; the rotary shaft having an elastic element at a second end thereof;
      an external gear seat; the external gear seat having a toothed seat, which is engaged with the toothed seat of the central shaft; the external gear seat being positioned around the rotary shaft such that the rotary shaft is linearly slidable and angularly displaceable within the external gear seat; a second elastic element being positioned between the external gear seat and the rotary shaft; and
      a clutch toothed ring seat; the clutch toothed ring seat having a toothed portion at a first end thereof, which is next to the toothed portion of the rotary shaft; the clutch toothed ring seat being joined to a straight power seat at a second end thereof;

the rotary shaft be capable of being engaged with and disengaged from a toothed portion of the clutch toothed ring seat at the toothed portion thereof;

whereby the piston sleeve of the central shaft can be actuated such that the moving sticks and the push rod are moved forwards, and the rotary shaft of the actuating seat is engaged with the clutch toothed ring seat for allowing a tool of the straight power tool seat to function, and whereby the piston sleeve of the central shaft can be actuated such that the moving sticks and the push rod are moved backwards, and the rotary shaft of the actuating seat is disengaged from the clutch toothed ring seat for allowing replacement of the clutch toothed ring seat.

3. The structure of a twin disc type tool turret device as claimed in claim 1 or 2, wherein the rolling bead is held in the connecting portion of the pivotal shaft such that the connecting portion of the pivotal shaft will touch the connecting head of the rotary shaft at single point, and there won't be high temperature produced owing to rubbing of the rotary shaft against the connecting portion of the pivotal shaft.

* * * * *